United States Patent Office 3,249,616
Patented May 3, 1966

3,249,616
(-)-3,14-DIHYDROXY-6-OXO-N-PHENETHYLMOR-
PHINAN (CIS) AND PRODUCTION THEREOF
Yoshiro Sawa, Ashiya-shi, Naoki Tsuzi, Senboku-gun, Osaka, and Haruhiko Tada, Toyonaka-shi, Japan, assignors to Shionogi & Co. Ltd., Osaka, Japan
No Drawing. Filed Nov. 12, 1964, Ser. No. 410,761
Claims priority, application Japan, Apr. 6, 1962, 37/14,060, 37/14,061
3 Claims. (Cl. 260—285)

This application is a continuation in part of co-pending application S.N. 270,186, filed April 3, 1963.

The present invention relates to (-)-3,14-dihydroxy-6-oxo-N-phenethylmorphinan (cis) and production thereof. More particularly, it relates to (-)-3,14-dihydroxy-6-oxo-N-phenethylmorphinan (cis) represented by the formula:

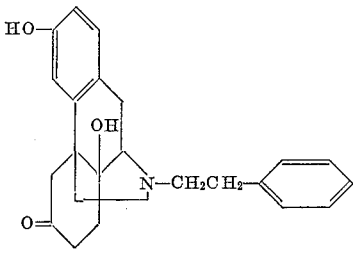

which possesses a high analgesic activity and production thereof.

Accordingly, a basic object of the present invention is to embody (-)-3,14-dihydroxy-6-oxo-N-phenethylmorphinan (cis). Another object of this invention is to embody (-)-3,14-dihydroxy-6-oxo-N-phenethylmorphinan (cis) useful as an analgesic agent. A further object of the invention is to embody a process for preparing (-)-3,14-dihydroxy-6-oxo-N-phenethylmorphinan (cis). These and other objects will be apparent to those conversant with the art to which the present invention pertains from the subsequent description.

The said (-) - 3,14-dihydroxy-6-oxo-N-phenethylmorphinan (cis) can be prepared by subjecting (-)-3-methoxy-6-oxo-14-hydroxy-N-phenethylmorphinan (cis) represented by the formula:

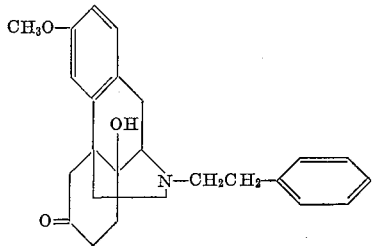

to hydrolytic fission.

The starting (-)-3-methoxy-6-oxo-14-hydroxy-N-phenethylmorphinan (cis) may be prepared from (-)-3-methoxy-6-oxo-14-hydroxy-N-methylmorphinan (cis) [U.S. Patent 3,085,091] by reacting the same with cyanogen bromide to replace the methyl group at the N-position with a cyano group, treating the resulting N-cyano compound with hydrochloric acid to eliminate the cyano group at the N-position and reacting the resultant N-unsubstituted compound with phenethyl bromide.

According to the present invention, the starting (-)-3-methoxy-6-oxo-14-hydroxy-N-phenethylmorphinan (cis) is subject to hydrolytic fission by a per se conventional procedure which is employed for fission of alkyl phenyl ethers. Some examples of such procedures are as follows: (1) treatment with a mineral acid (e.g. hydrobromic acid, hydroiodic acid) while heating; (2) treatment with a halogenated aluminum compound (e.g. aluminum chloride, aluminum bromide, aluminum iodide) or a halogenated boron compound (e.g., boron fluoride, boron chloride) in the presence or absence of an inert solvent (e.g. benzene, toluene) while heating, followed by treatment with water or an acid; (3) treatment with an acid addition salt of pyridine base (e.g. pyridine hydrochloride, pyridine hydrobromide) while heating; (4) treatment with an alkali (e.g. potassium hydroxide, sodium hydroxide) in an inert solvent (e.g. triethyleneglycol, diethyleneglycol), preferably in the presence of an anti-oxidizing agent (e.g. hydrazine), while heating.

The resulting (-)-3,14-dihydroxy-6-oxo-N-pheneethylmorphinan (cis) forms acid addition salts with organic and inorganic acids. Illustrative acid addition salts include the hydrochloride, hydrobromide, hydroiodide, sulfate, phosphate, nitrate, tartrate, salicylate, benzoate, malate, citrate, acetate, etc.

The thus-produced (-)-3,14-dihydroxy-6-oxo-N-phenethylmorphinan (cis) and its acid addition salts exhibit remarkable analgesic activity. In comparison with a commercially available analgesic agent, levorphan tartrate ((-)-3-hydroxy-N-methylmorphinan tartrate), the analgesic activity and toxicity are shown in the folowing table:

TABLE

| Compound | Analgesic activity | | Toxicity LD$_{50}$, mg./kg. |
|---|---|---|---|
| | Haffner-Hesse method | D'Amour-Smith method | |
| Levorphan tartrate | 3.9 | 9.1 | 189.8 |
| (-)-3,14-dihydroxy-6-oxo-N-phenethyl-morphinan (cis) hydrobromide | 31.1 | 100.0 | 345.0 |
| (-)-3,14-dihydroxy-6-oxo-N-phenethyl-morphinan (cis) hydrochloride | 44.0 | 83.0 | 600.0 |

NOTE.—The analgesic activity was observed by the Haffner-Hesse method [Hesse: Arch. exp. Path. u. Pharm., Vol. 158, p. 233 (1930)] in mice and the D'Amour-Smith method [D'Amour et al.: J. Pharmacol., Vol. 1, p. 255 (1964)] in rats and is shown as the effective ratio to morphine the value of which is expressed as 1. The toxicity was tested by subcutaneous administration of the tested compound to mice.

Thus, (-)-3,14-dihydroxy-6-oxo-N-phenethylmorphinan (cis) and its acid addition salts are useful as analgesic agents.

A presently-preferred embodiment of the present invention is illustratively shown in the following example. The relationship of parts by weight to parts by volume is the same as that between grams and milliliters. Temperaures are set forth in degrees centigrade.

Example (-)-3-methoxy-6-oxo - 14 - hydroxy - N - phenethylmorphinan (cis) (6.3 parts by weight) is dissolved in 48% hydrobromic acid (60 parts by volume), and the resultant solution is refluxed for 15 minutes. The reaction mixture is combined with water, made alkaline with aqueous ammonia and shaken with dichloromethane. The dichloromethane layer is concentrated under reduced pressure. The residue is dissolved in chloroform and chromatographed on alumina. The eluate with a mixture of 20% methanol and chloroform is concentrated under reduced pressure and the residue crystallized from ethanol to give (-)-3,14-dihydroxy-6-oxo - N - phenethylmorphinan (cis) (3.7 parts by weight) as crystals melting at 182 to 184° C. $[\alpha]_D^{22}$ —107° (CHCl$_3$, c.=1).

The above prepared base is treated with hydrochloric acid or hydrobromic acid to give the hydrochloride or hydrobromide. Hydrochloride (dihydrate): M.P., 309° C. (decomp.). Hydrobromide (dihydrate): M.P., 296° C. (decomp.).

1. (-)-3,14-dihydroxy-6 - oxo - N - phenethylmorphinan (cis).
2. (-)-3,14-dihydroxy-6-oxo - N - phenethylmorphinan (cis) hydrochloride.
3. (-)-3,14-dihydroxy - 6 - oxo - N-phenethylmorphinan (cis) hydrobromide.

References Cited by the Examiner
UNITED STATES PATENTS
3,085,091  4/1963  Sawa _____ 260—285

FOREIGN PATENTS
765,920  1/1957  Great Britain.

NICHOLAS S. RIZZO, *Primary Examiner.*